United States Patent Office 3,294,821
Patented Dec. 27, 1966

3,294,821
PROCESS FOR THE SEPARATION OF DIANHYDRIDES FROM A MIXTURE OF DIANHYDRIDES AND MONOHYDRIDE
Charles M. Selwitz, Pitcairn, Pa., assignor to Gulf Research & Development Company, Pittsburgh, Pa., a corporation of Delaware
No Drawing. Filed Oct. 18, 1965, Ser. No. 497,533
7 Claims. (Cl. 260—347.8)

This invention relates to a process for separating di(2,3-propyldicarboxylic acid anhydride)aryls from a mixture containing the same and (2,3-propyldicarboxylic acid anhydride)alkylaryls.

Aryl compounds carrying two or more alkyl substituents thereon can be reacted with maleic anhydrides to obtain the dianhydride, di(2,3-propyldicarboxylic acid anhydride)aryls. Unfortunately, during the conversion the monoanhydride, (2,3-propyldicarboxylic acid anhydride) alkylaryls, is also formed. The dianhydride can be separated from the monoanhydride by distillation, for example, at a temperature of about 150° to about 250° C. at a pressure of about 0.00001 to about 1.0 pounds per square inch. However, such conditions are so severe that in order to remove substantially all of the monoanhydride from the mixture appreciable decomposition and/or degradation of the desired dianhydride takes place. To avoid such decomposition and/or degradation less stringent conditions within the range defined can be employed, but this means that not all of the monoanhydride is removed from the mixture and a pure dianhydride is not obtained.

I have found that such separation can be effectively obtained and a substantially pure dianhydride can be recovered from the defined mixture by the expedient of treating such mixture with a selected hydrocarbon. The desired dianhydride will not dissolve in the hydrocarbon. Since the monoanhydride will dissolve in the hydrocarbon, however, simple mechanical separation will suffice to recover a purified dianhydride.

The defined procedure can be employed to recover the dianhydride from any mixture containing the same and the defined monoanhydride. In a preferred method the mixture is obtained from a two-stage operation involving the use of an aryl compound carrying two or more alkyl substituents and a maleic anhydride.

The aryl compound employed can be any aryl compound carrying two or more alkyl substituents thereon having from one to 137 carbon atoms, preferably from two to 13 carbon atoms, on nonadjacent carbon atoms thereof, such as methyl, ethyl, n-propyl, isopropyl, 1-methyloctyl, n-dodecyl, 1-methylnonahexacontyl, 3-phenyl-3-methylheptyl, 3,4,5-triethyldodecyl, 1-propyl-3-cyclohexylnonyl, 2-methylpropyl, butyl, 1-methylpropyl, amyl, 1-methylbutyl, 2-ethylpentyl, etc. The alkyl substituents must, moreover, be ones carrying at least one hydrogen on the carbon that is attached to the aryl ring. Examples of dialkyl aryl compounds that can be employed include methylethylbenzene, 1-propyl-4-(1-methylethyl) naphthalene, meta-diisopropylbenzene, para-diisopropylbenzene, para,para'-di(1 - methyloctyl)diphenyl, para - (para-[1-methylnonahexacontyl]phenyl) (para-[3-phenyl-3-methylheptyl]phenyl)benzene, 1-(3,4,5-triethyldodecyl) - 5 - (1-propyl-3-cyclohexylnonyl)anthracene, 2 - (2 - methylpropyl)-6-butylphenanthrene, 1-amyl - 6 - (1 - methylbutyl)chrysene, 2,7-di(2-ethylpentyl)pyrene, etc. To react with the dialkylaryl compounds defined above a maleic anhydride, such as maleic anhydride itself or a mono-substituted maleic anhydride, such as citraconic anhydride, ethylmaleic anhydride, methoxymaleic anhydride, etc., is employed.

In the first step at least about one to about 100 mols of the polyalkylaryl compounds defined above are brought into contact with a mol of the defined maleic anhydride in the presence of about 0.01 to about 20, preferably about 0.1 to about 5.0 percent by weight, based on the maleic anhydride, of a free radical or free radical generating catalyst, for example, peroxides, such as lauroyl peroxide, cumene hydroperoxide, benzoyl peroxide, di-t-butyl peroxide, etc., azo compounds, such as azo bisisobutyronitrile, azoethane, azo biscyclohexylnitrile, etc.

The mixture of the maleic anhydride, the polyalkylaryl compound and the free radical or free radical generating catalyst is then heated at a temperature of about 50° to about 200° C., preferably at a temperature of about 90° to about 160° C., and a pressure of about one to about 150 pounds per square inch, preferably atmospheric pressure, for about 10 to about 10,000 minutes, preferably about one to about 50 hours.

At the end of this time, an addition product of one mol of the dialkylaryl compound per mol of the maleic anhydride employed is obtained, namely, a (2,3-propyldicarboxylic acid anhydride)alkylaryl in solution. The addition product is recovered from the reaction mixture in any suitable manner. Thus, the mixture can be heated at a temperature of about 100° to about 200° C. and a pressure of about 0.000014 to about 14.0 pounds per square inch, and unreacted dialkylaryl compound and maleic anhydride are thereby removed overhead to leave behind the defined addition product.

In a preferred method, the defined addition product is obtained in a purer state and removed from small quantities of 1-arylpentane-2,3,4,5-tetracarboxylic acid dianhydrides, di(2,3-propyldicarboxylic acid anhydride)aryls and other high boiling impurities by distillation at a temperature of about 150° to about 250° C. at a pressure of about 0.00001 to about 1.0 pound per square inch.

The addition product thus obtained is then reacted with one of the maleic anhydrides defined above, preferably the same maleic anhydride employed in the first step described above, in the presence of one of the free radical or free radical generating catalysts, also defined above at a temperature of about 50° to about 200° C., preferably about 90° to about 160° C., and a pressure of about one to about 150 pounds per square inch, preferably about 10 to about 20 pounds per square inch, for about 10 to about 10,000 minutes, preferably for about one to about 50 hours. At least about one to about 100 mols of said addition product are employed per mol of said maleic anhydride. The catalyst is present in an amount corresponding to about 0.01 to about 20 percent by weight, preferably about 0.1 to about 5.0 percent by weight, based on the maleic anhydride.

At the end of the second reaction period the reaction mixture contains the desired di(2,3-propyldicarboxylic acid anhydride)aryl, unreacted (2,3-propyldicarboxylic acid anhydride)alkylaryl and perhaps some unreacted maleic anhydride and catalyst. As pointed out above, it is possible to subject the reaction mixture to distillation conditions to remove overhead unreacted (2,3-propyldicarboxylic acid anhydride)alkylaryl, maleic anhydride and catalyst, leaving behind the desired di(2,3-propyldicarboxylic acid anhydride)aryl, but the temperature and pressures sufficient to remove overhead all of the undesired (2,3-propyldicarboxylic acid anhydride)alkylaryl are so severe that there would be a tendency for the desired di(2,3-propyldicarboxylic acid anhydride)aryl to decompose and/or degrade. Conditions avoiding decomposition and/or degradation are such as to leave some of the undesired (2,3-propyldicarboxylic acid anhydride) alkylaryl in admixture with the desired di(2,3-propyldicarboxylic acid anhydride)aryl to thereby contaminate the latter.

I have found that an effective separation can be made by treating the mixture containing the defined monohydride and the defined dianhydride with a hydrocarbon. The treatment involves contacting the mixture with the hydrocarbon. The desired dianhydride is not soluble in the hydrocarbon, while the undesired monoanhydride, and unreacted maleic anhydride and catalyst, if present, are soluble in the same. Recovery of the desired dianhydride can be effected from the hydrocarbon solution in any convenient manner, for example, by mechanical means such as filtration or decantation. Recovery of the undesired monoanhydride, and of the maleic anhydride and catalyst, if present, from the hydrocarbon solution can be effected in any manner, for example, by distillation at a temperature of about 0° to about 200° C. at a pressure of about 0.01 to about 100 pounds per square inch, leaving behind the monoanhydride.

Any hydrocarbon which is liquid at the separation conditions employed herein can be used. Thus paraffins such as butane, pentane, hexane, isobutane, 2-methylpentane, cyclopentane, cyclobutane, ethylcyclobutane, octane, nonane, heptane, decane, isooctane, methylcyclopentane, 1,3-dimethylcyclohexane, etc.; aromatics, such as benzene, toluene, ethylbenzene, cumene, xylene, mesitylene, diisopropylbenzene, pseudocumene, etc.; and olefins, such as butene-1, isobutylene, pentene-1, 3-methylbutene-1, cyclohexane, cyclododecene, vinylcyclohexane, octene-1, octene-4, trans-heptene-3, hexadecene-1, octyne-4, octadiene-1,7, 4-methyldecyne-2, tetramethylethylene, etc., can be employed. Chlorinated hydrocarbons, such as chloroform, chlorobenzene, fluorobenzene, vinylbromide, 1-chloropentane, ethylidene dibromide, 2-chlorododecane, 3-chloropentene-2, etc., can also be employed.

Temperature and pressure conditions required during the separation procedure are not critical, provided they are sufficient to maintain the defined hydrocarbon in the liquid state. Thus, a temperature of about 0° to about 150° C., preferably about 20° to about 80° C., and a pressure of about one to about 500 pounds per square inch, preferably of about 10 to about 100 pounds per square inch, can be employed. The time required for such treatment is also not critical, but can be, for example, at least about 0.1, preferably from about five to about 60 minutes. The amount of hydrocarbon employed is similarly not critical, provided it is sufficient to solubilize all of the material in admixture with the desired dianhydride. The amount of hydrocarbon employed is also dependent upon the actual procedure used herein. Thus, if the mixture is to be treated but once, a relatively large amount of hydrocarbon is required. However, if a multiple treatment is employed and to save in the amount of hydrocarbon used this procedure is preferred, a small amount of hydrocarbon is employed. Thus, in the latter procedure, the mixture is treated under the defined conditions with a small amount of hydrocarbon. The precipitated dianhydride is separated from the hydrocarbon solution, and the hydrocarbon is separated from the resulting solution, as described. The recovered hydrocarbon is then again used to treat the remainder of the original mixture to recover additional dianhydride therefrom, and this procedure is repeated until all of the desired dianhydride is recovered that was present in the original mixture.

The di(2,3-propyldicarboxylic acid anhydride)aryls structurally can be represented as follows:

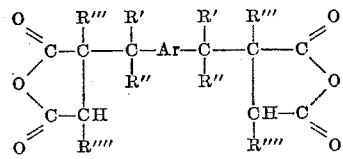

wherein R' and R" are selected from the group consisting of hydrogen and alkyl groups having from one to 68 carbon atoms, preferably from one to six carbon atoms, and R''' and R'''' are selected from the group consisting of hydrogen, alkyl and alkoxy groups having from one to nine carbon atoms, preferably from one to three carbon atoms, such as methyl, ethyl, n-propyl, isopropyl, n-butyl, secondary butyl, isobutyl, n-heptyl, n-nonyl, methoxy, etc., and Ar is an aryl radical derived from aromatic compounds, such as benzene, naphthalene, diphenyl, terphenyl, anthracene, phenanthrene, chrysene, pyrene, ferrocene, thiophene, furan, etc., preferably benzene. The aryl radical can contain such diverse substituents as methoxy, cyano, trifluoromethyl, nitro, chloro, tertiarybutyl, tertiarybutoxy, trifluoromethoxy, carbomethoxy, tertiary-amyl, 1-methylcyclopentyl, etc. In all cases, however, the ring carbon atoms bearing the 2,3-propyldicarboxylic acid anhydride radicals, or the corresponding acid radicals, must be separated from each other by at least one carbon atom, for I have found that the defined anhydride radicals will not attach themselves to carbon atoms ortho to each other on the aryl ring. In a preferred embodiment at least one of R' and R" is an alkyl substituent, and the compound can be defined as being a di(1-alkyl-2,3-propyldicarboxylic acid anhydride)aryl, such as a di(1-methyl-2,3-propyldicarboxylic acid anhydride)benzene. In a more preferred embodiment each of R' and R" are alkyl substituents and the compound can be defined as being a di(1,1-dialkyl-2,3-propyldicarboxylic acid anhydride)aryl, such as di(1,1-dimethyl-2,3-propyldicarboxylic acid anhydride)benzene. Specific dianhydrides recovered herein are meta-(2,3-propyldicarboxylic acid anhydride) (1-methyl-2,3-propyldicarboxylic acid anhydride)benzene, 1-(1-ethyl-2,3-propyldicarboxylic acid anhydride)-4-(1,1-dimethyl-2,3-propyldicarboxylic acid anhydride) naphthalene, meta-di(1,1-dimethyl-2,3-propyldicarboxylic acid anhydride)benzene, para-di(1,1-dimethyl-2,3-propyldicarboxylic acid anhydride)benzene, para,para'-di(1-methyl-1-heptyl-2,3-propyldicarboxylic acid anhydride)diphenyl, para-(para-[1,methyl-1-octahexacontyl-2,3-propyldicarboxylic acid anhydride]phenyl) (para-[1-(2-methyl-2-phenylhexyl)-2,3-propyldicarboxylic acid anhydride]phenyl)benzene, 1-(1-[3,4,5-triethylundecyl]-2,3-propyldicarboxylic acid anhydride)-5-(1-propyl-2,3-propyldicarboxylic acid anhydride)-4,8-dimethoxyanthracene, 2-(1-isopropyl-2,3-propyldicarboxylic acid anhydride)-6-(1-propyl-2,3-propyldicarboxylic acid anhydride)-8-cyano-10-tertiaryamylphenanthrene, 1-(1-butyl-2,3-propyldicarboxylic acid anhydride)-6-(1-methyl-1-propyl-2,3-propyldicarboxylic acid anhydride)-8-trifluoromethyl-10-nitrochrysene, 2,7-di(1-[1-ethylbutyl]-2,3-butyldicarboxylic acid anhydride)dicarbomethoxypyrene, etc.

The (2,3-propyldicarboxylic acid anhydride)alkylaryls associated with the above and which contaminates the same structurally can be represented as follows:

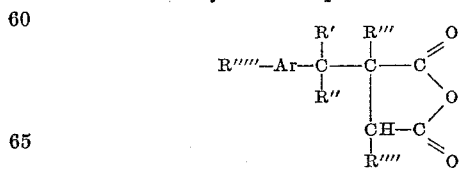

wherein Ar, R', R", R''' and R'''' are as defined above and R''''' is an alkyl substituent such as defined to be on the aryl compound reacted with the maleic anhydride. As with the di(2,3-propyldicarboxylic acid anhydride) aryl defined above, the aryl radical of the monoanhydride can carry the same diverse substituents, and the ring carbon atoms bearing the anhydride radical and the alkyl radical will be separated from each other by at least one carbon atom. Specific monoanhydride impurities found in admixture with the desired dianhydride are meta (1,1-dimethyl-2,3-propyldicarboxylic acid anhydride)isopropylbenzene,
para (1,1-dimethyl-2,3-propyldicarboxylic acid anhydride)isopropylbenzene,
meta (1-methyl-2,3-propyldicarboxylic acid anhydride) butylbenzene,
para (1-ethyl-2,3-propyldicarboxylic acid anhydride) methylbenzene,
1-(1-ethyl-2,3-propyldicarboxylic acid anhydride)-4-isopropylnaphthalene,
1-(1-ethylpropyl)-4-(1,1-dimethyl-2,3-propyldicarboxylic acid anhydride)naphthalene,
4-(1,1-dimethyl-2,3-propyldicarboxylic acid anhydride)-4'-isopropyldiphenyl,
para (para [1-methyl-1-octahexacontyl-2,3-propyldicarboxylic acid anhydride]phenyl) (para [1-methyl-2-phenyl-2-methylhexyl]-phenyl)benzene,
para (para [1-methylnonahexacontyl]phenyl)-(para [1-(2-methyl-2-phenylhexyl)-2,3-propyldicarboxylic acid anhydride]phenyl)benzene,
1-(1-[3,4,5-triethylundecyl]-2,3-propyldicarboxylic acid anhydride)-5-isopropyl-4,8-dimethoxy anthracene,
2-isopropyl-6-(1-propyl-2,3-propyl-dicarboxylic acid anhydride)-8-cyano-10-tertiary-amylphenanthrene,
1-(1-butyl-3-methyl-2,3-propyldicarboxylic acid anhydride)6-(1-ethylbutyl)-8-trifluoromethyl-10-nitrochrysene,
2-(1-[1-ethylbutyl]-2,3-butyldicarboxylic acid anhydride)-7-(1-butyl-2-ethylpentyl)pyrene,
meta (1-methyl-2,3-propyldicarboxylic acid anhydride) ethylbenzene,
para (1-methyl-2,3-propyldicarboxylic acid anhydride) ethylbenzene, etc.

The di(2,3-propyldicarboxylic acid anhydride)aryls recovered herein can be employed in many reactions with organic compounds to produce desirable products. Thus, they can be employed in reaction with epoxy resins, particularly those based on Bisphenol A, for example, epoxy resin containing the following structure:

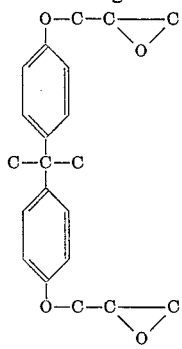

with di-primary-amines, such as para-phenylenediamine, meta-phenylenediamine, ethylenediamine, 1,4-butanediamine, 1,2-propanediamine, triethylenetetramine, 1,6-hexanediamine, 3,3'-diaminodipropyl ether, 3,3'-diaminodipropylamine, 1,4-bis(aminomethyl)cyclohexane, 4,4'-diaminobenzophenone, tetramethyl - para - phenylenediamine, para,para'-diaminodiphenyl, 2,4-toluene diamine, 4,4'-diaminodiphenyl ether, 1,4-diaminonaphthalene, para, para'-diaminodiphenyl sulfone, etc., dihydroxy compounds, such as ethylene glycol, 1,3-propanediol, 1,2-propanediol, 2,3-butanediol, 3-methoxy-1,2-propanediol, 1,4-butanediol, 1,10-decanediol, 1,6-hexanediol, dipropylene glycol, 2-methyl-2-nitro-1,3-propanediol, 1,5-pentanediol, 1,4-di(hydroxymethyl)cyclohexane, bisphenol-A, hydroquinone, resorcinol, para,para'-dihydroxydiphenyl, etc., polyhydroxy compounds, such as pentaerythritol, glycerine, sorbitol, mannitol, L-plus-arabinose, 1,2,6-hexanetriol, pyrogallol, phloroglucinol, etc., aminohydroxy compounds, such as aminoethanol, 2-aminopropanol, para-aminophenol, meta-aminophenol, 1-amino-4-hydroxybutane, 6-amino-1,3-dihydroxyhexane, 3-aminopropyl 3-hydroxypropyl ether, 1-aminomethyl-4-hydroxymethylcyclohexane, 4-amino-4-hydroxybenzophenone, 3-amino-3'-hydroxydiphenyl, 4-hydroxy-meta-phenylenediamine, 4-amino-5-hydroxy-naphthalene, 4-amino-6-hydroxyhexane, 1-amino-10-hydroxydecane, 1-amino-4-hydroxycyclohexane, 1-amino-4-hydroxybutene-2, 1-amino-2-hydroxybutene-3, 2-amino-1-hydroxybutene-3, etc.

The invention can further be illustrated by reference to the following:

*Example I*

Into a pot containing 4253 grams of mixed diisopropylbenzenes (68.1 percent by weight of meta diisopropylbenzene, 2.4 percent by weight of ortho diisopropylbenzene and 29.5 percent by weight of para diisopropylbenzene) at 170° C. and under an atmosphere of nitrogen there was added one kilogram of molten maleic anhydride over a period of six hours and 20 grams of azo bisisobutyronitrile in 849 grams of the same diisopropylbenzene mixture over a period of five hours. Heating was maintained for an additional period of two hours. There was then added another kilogram of maleic anhydride over a period of five hours and 7.5 grams of azo bisisobutyronitrile in 423 grams of the same diisopropylbenzene mixture over a period of six hours. Heating was maintained for an additional two hours. Finally, another addition of 7.5 grams of azo bisisobutyronitrile in 423 grams of the same diisopropylbenzene was added to the mixture at a temperature of 170° C. over a period of six hours. There was formed approximately 3000 grams of mixed meta- and para-(1,1-dimethyl-2,3-propyldicarboxylic acid anhydride)isopropylbenzene, of which 2400 grams were isolated by vacuum distillation. Into a flask there was placed 1691 grams of the mixture obtained above, and to this, at 120° C. and under atmospheric nitrogen pressure, there was added 400 grams of maleic anhydride over a period of five hours and a solution of 10 grams of benzoyl peroxide in 800 grams of the mixed (1,1-dimethyl-2,3-propyldicarboxylic acid anhydride)isopropylbenzene obtained above over a period of six hours. The contents were stirred and maintained at 120° C. for an additional two hours. The unreacted monoanhydrides were removed by distillation, with stirring, to a pot temperature of 212° C. at 0.8 millimeter of mercury. The slightly yellow colored solid obtained amounting to 860 grams, melted at temperatures ranging from 44°–49° C. and was found to consist of 90.6 percent of mixed meta- and para-di-(1,1-dimethyl-2,3-propyldicarboxylic acid anhydride) benzene and 9.4 percent of the mixed (1,1-dimethyl-2,3-propyldicarboxylic acid anhydride)isopropylbenzene charged to the reaction. Fifty grams of this material was triturated with 100 cc. of diisopropylbenzene in a Waring blender, the liquid was removed and the trituration was repeated with another 100 cc. of diisopropylbenzene. Removal of this liquid left the dianhydride as a much lighter colored solid which contained no monoanhydride.

*Example II*

In a similar preparation of dianhydride the unreacted monoanhydride was not removed by distillation. Instead, 51.2 grams of product containing 5.0 grams of dianhydride was stirred with 200 cc. of heptane at room temperature. Removal of the upper phase left about 14 grams of viscous liquid. This was again extracted with 200 cc. of heptane at room temperature to leave 5.7 grams of a sticky solid. This was heated in 300 cc. of heptane at 60° C. for one hour and removal of the liquid phase and drying of the solid in a vacuum oven left 5.0 grams of dianhydride as a crystalline, colorless solid which melted at 72° C.

In addition to the above, I have also employed chloroform, benzene, toluene, octene-1 and pentane for purposes of such separation and found the same to be effective. On the other hand, ethyl acetate, ether, acetic acid and acetone were found to be ineffective for such purpose.

Obviously, many modifications and variations of the invention as hereinabove set forth can be made without departing from the spirit and scope thereof and therefore only such limitations should be imposed as are indicated in the appended claims.

I claim:
1. A process for separating the dianhydride having the following structural formula

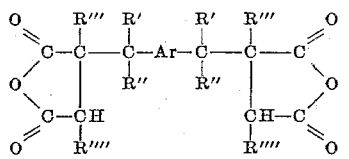

wherein R' and R" are selected from the group consisting of hydrogen and alkyl groups having from one to six carbon atoms, R'" and R"" are selected from the group consisting of hydrogen and alkyl groups having from one to nine carbon atoms, and Ar is phenyl, from a mixture containing the same and a monoanhydride having the following structural formula

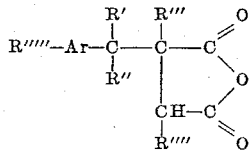

wherein R', R", R'" and R"" are as defined above, R'"" is an alkyl group having from one to 13 carbon atoms, and Ar is phenyl, which comprises treating said mixture with a liquid hydrocarbon selected from the group of liquid paraffins having from four to 10 carbon atoms, aromatics having from six to 12 carbon atoms, olefins having from four to 16 carbon atoms and chlorinated derivatives thereof to precipitate said dianhydride therefrom and thereafter recovering said dianhydride.

2. The process of claim 1 wherein the dianhydride is meta- and para-di(1,1-dimethyl-2,3-propyldicarboxylic acid anhydride)benzene and the mono anhydride is meta- and para-(1,1-dimethyl-2,3-propyldicarboxylic acid anhydride)isopropylbenzene.

3. The process of claim 1 wherein the dianhydride is meta- and para-di(1,1-dimethyl-2,3-propyldicarboxylic acid anhydride)benzene and the mono anhydride is meta- and para-(1,1-dimethyl-2,3-propyldicarboxylic acid anhydride)isopropylbenzene and the liquid hydrocarbon is diisopropyl benzene.

4. The process of claim 1 wherein the dianhydride is meta- and para-di(1,1-dimethyl-2,3-propyldicarboxylic acid anhydride)benzene and the mono anhydride is meta- and para-(1,1-dimethyl-2,3-propyldicarboxylic acid anhydride)isopropylbenzene and the liquid hydrocarbon is heptane.

5. The process of claim 1 wherein the dianhydride is meta- and para-di(1,1-dimethyl-2,3-propyldicarboxylic acid anhydride)benzene and the mono anhydride is meta- and para-(1,1-dimethyl-2,3-propyldicarboxylic acid anhydride)isopropylbenzene and the liquid hydrocarbon is chloroform.

6. The process of claim 1 wherein the dianhydride is meta- and para-di(1,1-dimethyl-2,3-propyldicarboxylic acid anhydride)benzene and the mono anhydride is meta- and para-(1,1-dimethyl-2,3-propyldicarboxylic acid anhydride)isopropylbenzene and the liquid hydrocarbon is pentane.

7. The process of claim 1 wherein the dianhydride is meta- and para-di(1,1-dimethyl-2,3-propyldicarboxylic acid anhydride)benzene and the mono anhydride is meta- and para-(1,1-dimethyl-2,3-propyldicarboxylic acid anhydride)isopropylbenzene and the liquid hydrocarbon is benzene.

References Cited by the Examiner
UNITED STATES PATENTS
3,098,095  7/1963  Knoblock et al. _____ 260—346.7

NICHOLAS S. RIZZO, *Primary Examiner.*